(12) United States Patent
Riemers

(10) Patent No.: US 8,769,648 B2
(45) Date of Patent: Jul. 1, 2014

(54) AUTHENTICATED HOME DIRECTORY

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 208 days.

(21) Appl. No.: 13/300,202

(22) Filed: Nov. 18, 2011

(65) Prior Publication Data

US 2013/0133051 A1 May 23, 2013

(51) Int. Cl.
| | |
|---|---|
| G06F 7/04 | (2006.01) |
| G06F 21/60 | (2013.01) |
| G06F 21/62 | (2013.01) |
| G06F 21/10 | (2013.01) |
| G06F 21/54 | (2013.01) |

(52) U.S. Cl.
CPC .............. *G06G 21/30* (2013.01); *G06F 21/604* (2013.01); *G06F 21/62* (2013.01); *G06F 21/10* (2013.01); *G06F 21/54* (2013.01)
USPC ................ 726/7; 709/205; 709/223; 707/705

(58) Field of Classification Search
CPC ....... G06F 21/30; G06F 21/604; G06F 21/62; G06F 21/10; G06F 21/54
USPC ........ 726/7; 709/205, 223; 707/705, 151, 112
See application file for complete search history.

(56) References Cited

U.S. PATENT DOCUMENTS

| | | | | |
|---|---|---|---|---|
| 7,908,339 | B2 * | 3/2011 | Keith, Jr. .......................... | 709/217 |
| 2004/0015723 | A1 * | 1/2004 | Pham et al. .................... | 713/201 |
| 2006/0136501 | A1 * | 6/2006 | Ijeomah et al. ................ | 707/200 |
| 2010/0262645 | A1 * | 10/2010 | Brown et al. ................... | 709/203 |
| 2011/0153697 | A1 * | 6/2011 | Nickolov et al. .............. | 707/827 |

OTHER PUBLICATIONS

He, Z, et al.; "Enforcing enterprise-wide policies over standard client-server interactions "; Proceedings of the 2005 24th IEEE Symposium on Reliable Distributed Systems (SRDS 2005). Digital Object Identifier: 10.1109/RELDIS.2005.17 Publication Year: 2005, pp. 119-130.*

Robinson, D.C., et al.; "Domain-based access control for distributed computing systems "; Software Engineering Journal vol. 3, Issue: 5, Publication Year: 1988, pp. 161-170.*

Anonymous. "How to :Auto + Secure Mount Remote SSH Filesys with AUTOFS and SSHFS + Samba )", located at http://ubuntuforums.org/archive/index.php/t-580989.html, last visited on Oct. 25, 2011, 12 pages.

Ubuntu. "SSHFS AUTOmount on Fesity, Gutsy, Hardy, Intrepid," located at http://ubuntuforums.org/showthread.php?t=430312, last visited on Oct. 25, 2011, 8 pages.

* cited by examiner

*Primary Examiner* — Hadi Armouche
*Assistant Examiner* — Angela Holmes
(74) *Attorney, Agent, or Firm* — Lowenstein Sandler LLP

(57) ABSTRACT

Methods and systems for home directory management are described. In one embodiment, a computing system receives a user login request, and in response, bind mounts a temporary directory on a local file system of the computing system. The temporary directory does not require authentication. The computing system prompts the user for user credentials and authenticate the user using the user credentials. In response to a successful authentication, the computing system mounts a non-native directory in the temporary directory.

22 Claims, 6 Drawing Sheets

AUTHENTICATED HOME DIRECTORY

TECHNICAL FIELD

Embodiments of the present invention relate to user logins to remote machines, and more specifically, to allowing a user login to an authenticated home directory in a secure manner.

BACKGROUND

It is not uncommon to create machines where the data source is not local. However, often the data access requires authentication separate from the user's login authentication to provide data at login and to maintain it as accessible for the duration of user. This presents some challenges to making a user's home directory accessible in a secure manner. Permitting a user to login to a remote machine may be done in various ways. Generally speaking, applications run on a server computing system (e.g., host computing system) and a terminal, also known as a thin client or X terminal, handles input and output from and to the user of the application. The terminal may be a client computing device, such as a desktop computer, a laptop computer, or other computing devices. Thin clients may be low-powered, lack a hard disk, etc. An interface can be presented on the client computing system, as if it were accessed locally. The interface can be used by a user to remotely log in to a networked computer hosting the services. In this computing environment, users may have home directories which are used across multiple machines. In one conventional approach, the home directory can be made accessible to a user by copying the home directory to the local system that the user is logged into.

Another approach is to use Network File System (NFS) protocol to share disks between different machines. In particular, data storage disks contain files stored in filesystems within a standardized directory structure. New disks are added to the filesystem by attaching or mounting, the directories of their filesystem to a directory of an already existing filesystem. This in effect makes the new hard disk transparently appear to be a subdirectory of the filesystem to which it is attached. NFS was developed to allow a computing system to access directories on remote computers by mounting them on a local filesystem as if they were a local disk. The systems administrator on the NFS server has to define the directories that need to be activated, or exported, for access by the NFS clients, and administrators on the clients need to define both the NFS server and the subset of its exported directories to use. Data access over a network always introduced a variety of challenges, especially if the operation is intended to be transparent to the user, as is the case of NFS. The virtual filesystem (VFS) interface is the mechanism used by NFS to transparently and automatically redirect all access to NFS-mounted files to the remote server. This is done in such a way that files on the remote NFS server appear to the user to be no different than those on a local disk. VFS also translates these requests to match the actual filesystem format on the NFS server's disks. This allows the NFS server to be not only a completely different operating system, but also use different naming schemes for files with different file attribute types. The drawback of using NFS is that it is insecure.

Another approach is to use a sshfs command to mount a home directory. Secure Shell protocol (SSH) Filesytem (SSHFS) is a filesystem client that mounts and interacts with directories and files located on a remote server or workstation. The client interacts with the remote file system via the SSH file Transfer Protocol (SFTP), a network protocol providing file access, file transfer, and file management functionality over any reliable data stream. SFTP provides secure file transfer and a secure remote file system. Whilst SFTP clients may transfer files and directories, the related file system may not be mounted locally using SFTP alone. For example, Filesystem in Userspace (FUSE), which is a loadable kernel module that lets non-privileged users create their own filesystems without editing kernel code, may be used. When using FUSE, the filesystem code is run in the userspace while the FUSE module provides a bridge to the actual kernel interfaces. FUSE is particular useful for writing virtual file systems because, unlike traditional file systems that essentially save data to and retrieve data from disk, virtual filesystems do not actually store data themselves. They act as a view or translation of an existing file system or storage device. Using SSHFS, a locally-mounted file system may be treated in the same way as other volumes (such as CDs, DVDs, USB flash drives and shared disks).

Conventionally, in order to do an auto sshfs mount, a user creates a set of ssh keys that do not require a passcode. Then the administrator can access those keys in autofs or at boot time if they just want the mount to persist. The problem with storing ssh keys is this means a set of keys actually have to be available to the administrator. This is not practical in an environment where the users are managed remotely, such as in a Kerberos environment. For example, in some cases, the administrator may not even be aware when a new user is added or such. The other problem is this conventional method creates a central access for other machines on the network. Anyone who gains access to those keys can effectively breach any machine on the network using those same home directories. Another problem with the conventional method is that a shell script to mount the directory will cause the directory to persist until manually unmounted. Over time on a busy machine, various home directories would be mounted on that machine. This is a huge amount of network connections to maintain within the network, and of course again creates a one-stop hacking location. Anyone gaining administrator access has access to the directories who have logged on anytime in the past. Another problems when using auto sshfs mount with FUSE, most FUSE daemons are not stable for very long term use and can freeze their mount. When a user tries to subsequently login in, the user will find that their mount is frozen, and hence their login is deadlocked.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
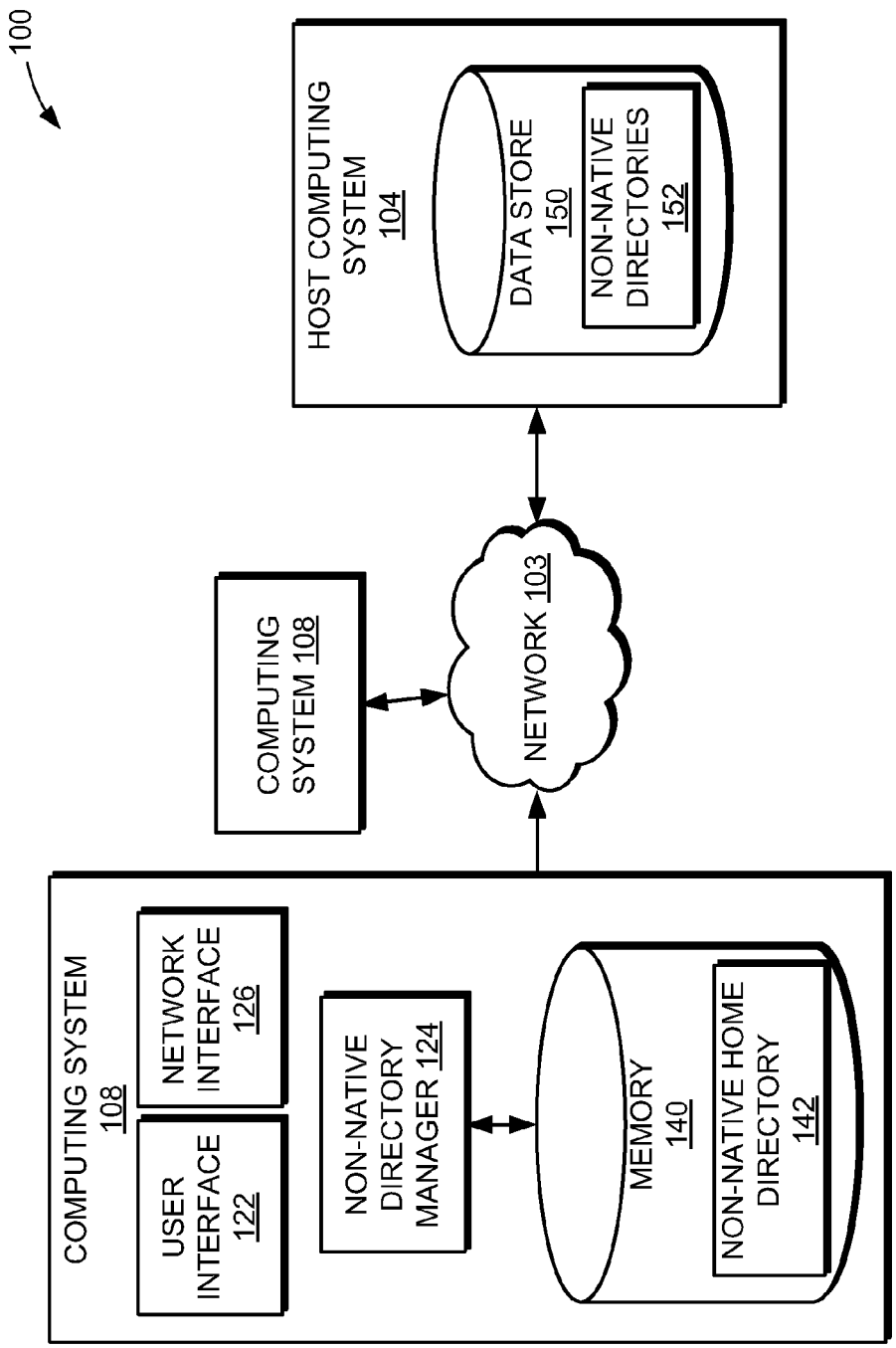
FIG. 1 is a block diagram of an exemplary network architecture in which embodiments of a non-native directory manager may operate.

Methods and systems for home directory management are described. In one embodiment, a computing system receives a user login request, and in response, automatically bind mounts a temporary directory on a local file system of the computing system. The temporary directory does not require authentication of a user. The computing system prompts the user for user credentials and authenticate the user using the user credentials. In response to a successful authentication of the user, the computing system automatically mounts a non-native directory in the temporary directory. The non-native directory is stored at a remote location from the computing system. In one embodiment, the non-native directory is a non-native home directory associated with the user. Alternatively, the non-native directory may be other types of directories as would be appreciated by one of ordinary skill in the art having the benefit of this disclosure.

In one embodiment, the computing system executes two scripts. The first script automatically creates the temporary directory, such as using a mkdir command, and mounts the temporary directory as a temporary file system in the local file system of the computing system such as using a mount-type tmpfs command. In one embodiment, a configuration skeleton directory may be stored in the /etc directory (e.g., /etc/skel/.), and after mounting the temporary directory as the file system, the first script can copy the contents of the configuration skeleton directory to the temporary directory. The first script may also flag the temporary directory with a designed file for automatically mounting the non-native directory (e.g., touch "$d/.automhome). This designated file can serve as the mountpoint for a second script (e.g., login script) described below. The first script can also change the ownership of the temporary directory from root users to the specific user (e.g., chown -R). For example, the temporary directory may include the same access permissions as the root under which it is created, and changing the ownership allows the user logging in to have access permissions for the temporary directory. This permissions may or may not exclude other non-root-access users or even root-access users. In some embodiments, FUSE is running as root and creates the home directory by copying a skel directory. So typically the permissions would be changed so the user can edit their new, temporary home directory, should the remote mounting fail. Some alternative methods of creating the home directory might not require this operation. For example, this operation may not be used if one assumed the home directory would always be auto-mounted. In that case, the user would never have direct access to the temporary directory. But if one assumes that users never have access to the auto created directory, then there is no need to copy a skeleton directory either, an empty directory would work just as well. There may be other reasons to change the directory to be owned by the user. Some login processes, such as an ssh remote login accesses the directory prior to the first opportunity to prompt for a password or such for the sshfs mount. When sshd finds a user's home directory is owned by someone else, sshd can reject the login attempt.

In one embodiment, the first script is as follows, but other scripts may be used as would be appreciated by one of ordinary skill in the art having the benefit of this disclosure.

```
#!/bin/bash
d="/home/$1"
if [ ! -d "$d" ]; then
    mkdir -p "$d"
    mount -n -o mode=755 -t tmpfs tmpfs "$d"
    cp -r /etc/skel/. "$d/."
    touch "$d/.autohome"
    chown -R "$1"."$1" "$d"
fi
```

This first script may use autofs to automatically bind mount a directory that does not require authentication by the user. The user may not have root access to the computing device. The autofs can create the temporary directory with specified permissions so the temporary directory does not require authentication by the user. Creating the temporary directory with autofs allows the temporary directory to be mounted in such a way that when the user is no longer using the temporary directory, autofs can unmount the temporary directory. In some embodiments, autofs can be configured to unmount the temporary directory after a specified period of non-use.

The second script may be a login script that automatically mounts the non-native directory to the temporary directory. The login script may be executed after the completion of the first script. The login script mounts the non-native directory (e.g., non-native home directory) upon successful authentication of the user. Of course, the user needs appropriate privileges to do the mount. The second script can be setup as a profile that uses sshfs and stored in the /etc directory (e.g., /etc/profile.d/autohome.sh script using sshfs). In one embodiment, the second script is as follows, but other scripts may be used as would be appreciated by one of ordinary skill in the art having the benefit of this disclosure.

```
sshhost=examplehost.com
sshfsopts="allow_other,nonempty,reconnect"
if [ -r "$HOME/.autohome" ]; then
    echo "Mounting your home directory."
    nohup sshfs -o $sshfsopts "$sshhost": "$HOME" && cd "$HOME"
fi
```

In one embodiment, as noted in the exemplary script above, FUSE options can be used, such as "allow_other," "nonempty," and "reconnect." Allow_other is needed if and only if you want other uses and root users to be able to access this directory. If you want only the user and root users to access the directory, then "allow_root" could be used. If neither option is used, then even daemons running as root will not be able to access this directory. So, for example, sshd would not be able to access the allowed host files using ssh. The "nonempty" option is used if and only if we are using a non-empty directory to automount the non-native directory. In the embodiment where a configuration skeleton directory is used to create the temporary directory, the temporary directory will be a non-empty directory. For example, the temporary directory has the contents copied from /etc/skel and the created .autohome file that flags the mountpoint for automatically mounting the non-native directory. The "reconnect" option may be used with sshfs to allow a more stable connection. This option is not available for all FUSE daemons.

It should be noted that there is no need really to persist any data on the machine for the user that is logging into a remote machine. Of course, the embodiments described herein allow the script to perform a bind mount instead to mount the non-native directory to have the data persist. Even a machine administrator does not have access to the remote directories of the users not currently logged in. Even someone who gains login access to a user's account does not necessarily have access to the authenticated directory. Also, since autofs automatically unmounts the temporary directory when no longer in use, the risks of deadlocks from stalled FUSE daemons are reduced as compared to the conventional methods. In addition, the number of FUSE daemons running on a particular machine at any given time is only the number of users actually logged in using the FUSE directories.

In other embodiments, a custom pluggable authentication module (PAM) module may be created. The custom PAM module could be used to authenticate the remote mount and the login authentication. For example, if one wanted to restrict to just the case when login was done via Kerberos authentication, it is also possible for ssh to use the same Kerberos authentication. In these embodiments, autofs can be combined with the PAM module to perform the same functions as autofs with the shell script as described herein. One possible advantage of using the PAM module is that it could be used to trigger any login, not just a shell login. However, the PAM module could be more complicated to implement and may not be able to be used with all types of authenticated FUSE mounts. The PAM module embodiments may be easier to implement in a corporate-wide solution as part of a corporate standard build or such.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "mounting," "flagging," "generating," "communicating," "capturing," "executing," "defining," "specifying," "creating," "recreating," "processing," "providing," "computing," "calculating," "determining," "displaying," "detecting," "sending," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a non-native directory manager may operate. The network architecture 100 may include a host computing system 104 and a client computing system 108, each connected via a network 103, which may be a private network (e.g., a local area network (LAN), wide area network (WAN), intranet, etc.) or a public network (e.g., the Internet). The client computing system 108 may be one or more machines, including a desktop computer, laptop computer, server, cellular phone, personal digital assistant (PDA), etc. In one embodiment, the client computing system 108 is a server of an enterprise, but is a "client" with respect to the host computing system 104, which may be another server in the enterprise network. The client computing system 108 interacts with the host computing system 104 by exchanging messages via standard protocols, e.g., HTTP and WebSockets or other transport protocols.

In the depicted embodiment, the client computing system 108 includes a user interface 122, and a network interface 126, and executes the non-native directory manager 124. The non-native directory manager 124 can perform various operations as described in more detail below with respect to FIGS. 2-3. For example, the non-native directory manager 124 can be used to automatically mount a non-native directory, such as a non-native home directory 142 associated with a user logging in at the client computing system 108. The non-native home directory 142 may be mounted in a temporary directory created by the non-native directory manager 124 in memory 140, as described in more detail below. In one embodiment, the memory 140 represents one or more memory devices, which may be random access memory (RAM), virtual memory, or other types of memories as would be appreciated by one of ordinary skill in the art having the benefit of this disclosure. It should be noted that the non-native directories 152 are considered non-native because they are not local directories of the client computing system 108. Rather, the non-native directories 152 are stored at a remote location from the client computing system 108. In one embodiment, the non-native directories 152 are stored in data store 150 of the host computing system 104. Alternatively, the non-native directories 152 may be stored in various data stores on one or more different host computing systems or storage devices.

The host computing system 104 may be one or more machines including one or more server computers, gateways, or other computing systems. The host computing system 104 hosts the services and/or applications used by the client computing system 108. The host computing system 104 includes the data store 150 that stores the non-native directories 152. The application may be a process run on the host computing system 104 to perform one or more functions. In one embodiment, the application is a web application that is accessed over the network 103. In one embodiment, the host computing system 104 renders client-side code of the web application to the browser in a browser-controlled environment, or is coded in a browser-supported language (e.g., JavaScript, combined with a browser-rendered markup language like HTML) and reliant on a common web browser to render the application executable. Alternatively, other techniques may be used to allow a user to login to the host computing system 104 via the client computing system 108 as would be appreciated by one of ordinary skill in the art having the benefit of this disclosure.

The data store 150 can be one or more centralized data repositories that store the non-native directories 152, application data, such as data used to execute one or more applications, user data, configuration data, or the like. The data store 150 may represent a single or multiple data structures (databases, repositories, files, etc.) residing on one or more mass storage devices, such as magnetic or optical storage based disks, tapes or hard drives. Although illustrated as being local to the host computing system 104, the data store 150 may be remote from the host computing system 104 and the host computing system 104 can communicate with the remote data store over a public or private network, a bus, or the like.

In another embodiment, the client computing system 108 may be a desktop computer that allow remote login to a virtual machine hosted by the host computing system 104. In this embodiment, the user can access the host computing system via a user interface, such as a web-based interface in which the user can request user login, and the non-native directory manager 124 automatically mounts an authenticated home directory for the user upon successful authentications. Alternatively, other confirmations may be used to allow remote login into a remote machine as would be appreciated by one of ordinary skill in the art having the benefit of this disclosure.

Figure 2:
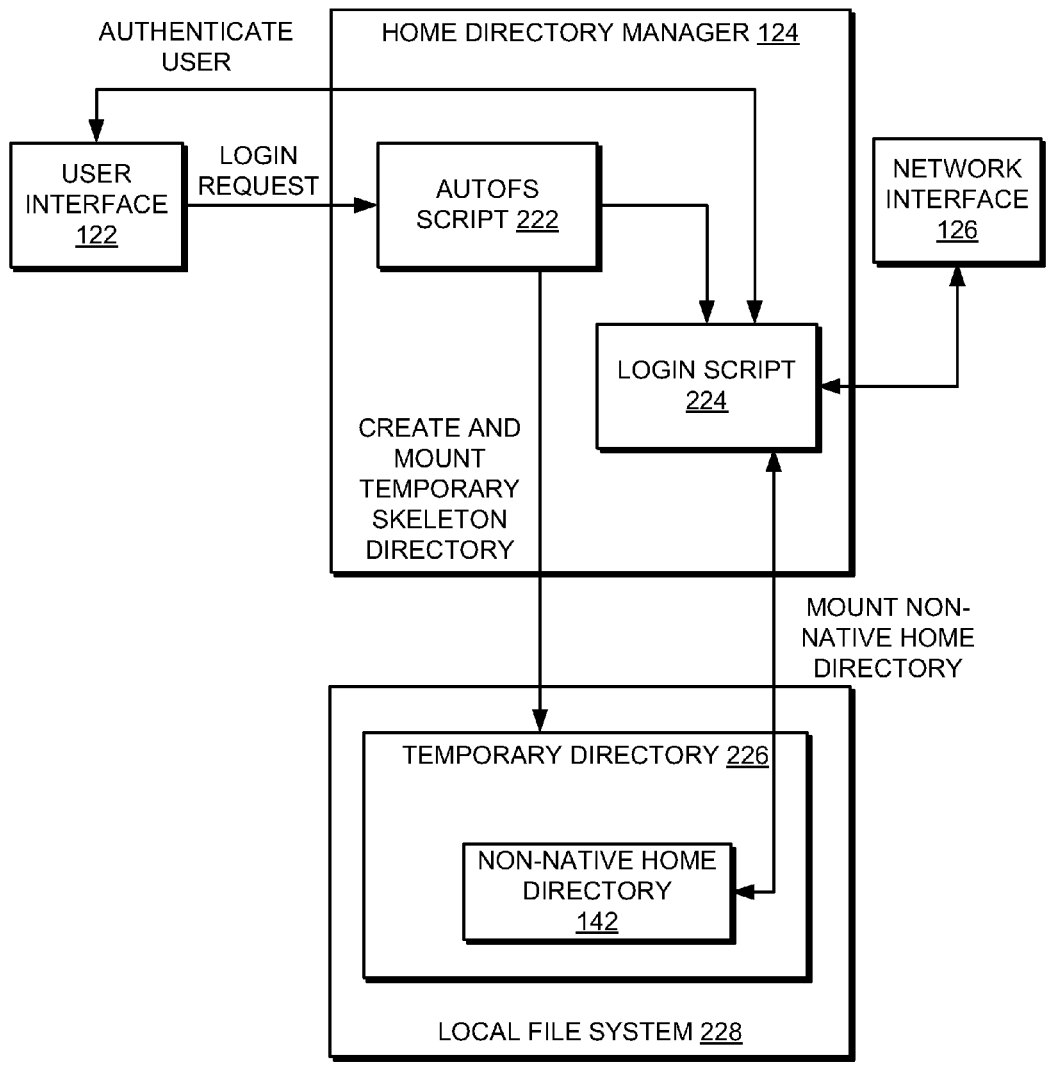
FIG. 2 is a block diagram of one embodiment of the non-native directory manager of FIG. 1.

FIG. 2 is a block diagram of one embodiment of the non-native directory manager 14 of FIG. 1. The non-native directory manager 124 includes two scripts, including an autofs script 222 and a login script 224. The autofs script 222 automatically creates the temporary directory 226, such as using a mkdir command, and mounts the temporary directory 226 as a temporary file system 228 in the local file system of the computing system 108, such as using a mount-type tmpfs command. The temporary file system 228 can be stored in RAM of the computing system 108. In another embodiment, the temporary file system 228 can be stored in other virtual memory, as well as other types of memory or storage devices. In one embodiment, a configuration skeleton directory may be stored in the /etc directory (e.g., /etc/skel/.), and after mounting the temporary directory 226 in the local file system 142, the autofs script 222 can copy the contents of the configuration skeleton directory to the temporary directory 226. In one embodiment, the autofs script 222 flags the temporary directory 226 by creating and storing a designed file for automatically mounting the non-native directory (e.g., touch "$d/.automhome). This designated file can serve as the mountpoint for a second script (e.g., login script) described below. In another embodiment, the autofs script 222 changes the ownership of the temporary directory 226 from root users to the specific user (e.g., chown -R). For example, the temporary directory may include the same access permissions as the root under which it is created, and changing the ownership allows the user logging in to have access permissions for the temporary directory 226. This permissions may or may not exclude other non-root-access users or even root-access users. In one embodiment, the autofs script 222 is the exemplary first script provided above. Alternatively, other scripts may be used as would be appreciated by one of ordinary skill in the art having the benefit of this disclosure.

The autofs script 222 may use autofs to automatically bind mount a directory that does not require authentication by the user. The user may not have root access to the computing device 108. The autofs can create the temporary directory 226 with specified permissions so the temporary directory 226 does not require authentication by the user. Creating the temporary directory 226 with autofs allows the temporary directory 226 to be mounted in such a way that when the user is no longer using the temporary directory 226, autofs can unmount the temporary directory 226. In some embodiments, autofs can be configured to unmount the temporary directory 226 after a specified period of non-use. Alternatively, the autofs can be configured to unmount the temporary directory 226 in response to other conditions.

In response to successful authentication as described below, the login script 224 automatically mounts the non-native home directory 142 to the temporary directory 226. In the depicted embodiment, the login script 224 mounts the non-native home directory 142 associated with the user logging in. In other embodiments, the login script 224 mounts other types of non-native directories, such as directories that are not the user's home directory but that are stored remotely from the computing system 108. The login script 2224 may be executed after the completion of the autofs script 222. The login script 224 mounts the non-native home directory 142 upon successful authentication of the user. Of course, the user needs appropriate privileges to do the mount.

In one embodiment, the login script 224 authenticates the user by prompting the user via the user interface 122 for user credentials. In one embodiment, the login script 224 presents the user interface 1122 to receive the user credentials. In another embodiment, the login request includes the user credentials and the login script 224 receives the user credentials from the login request. Upon receipt of the user credentials via the user interface 122, the login script 224 verifies the user credentials to authenticate the user. Upon successful authentication, the login script 224 automatically mounts the non-native home directory 142 associated with the user in the temporary directory 226. In one embodiment, the login script 224 performs a sshfs command to mount the non-native home directory 142 in the temporary directory 226 In another embodiment, the login script 224 determines if the use has designated privileges to the automatic mounting. The login script 224 allows the automatic mounting when the user has the designated privileges, and prevents the automatic mounting when the user does not have the designated privileges.

In one embodiment, the login script 224 can be setup as a profile that uses sshfs and can be stored in the /etc directory (e.g., /etc/profile.d/autohome.sh script using sshfs). In one embodiment, the login script 224 is the exemplary second script provided above. In one embodiment, as noted in the exemplary second script above, FUSE options can be used, such as "allow_other," "nonempty," and "reconnect." Alternatively, other scripts may be used as would be appreciated by one of ordinary skill in the art having the benefit of this disclosure.

Figure 3A:
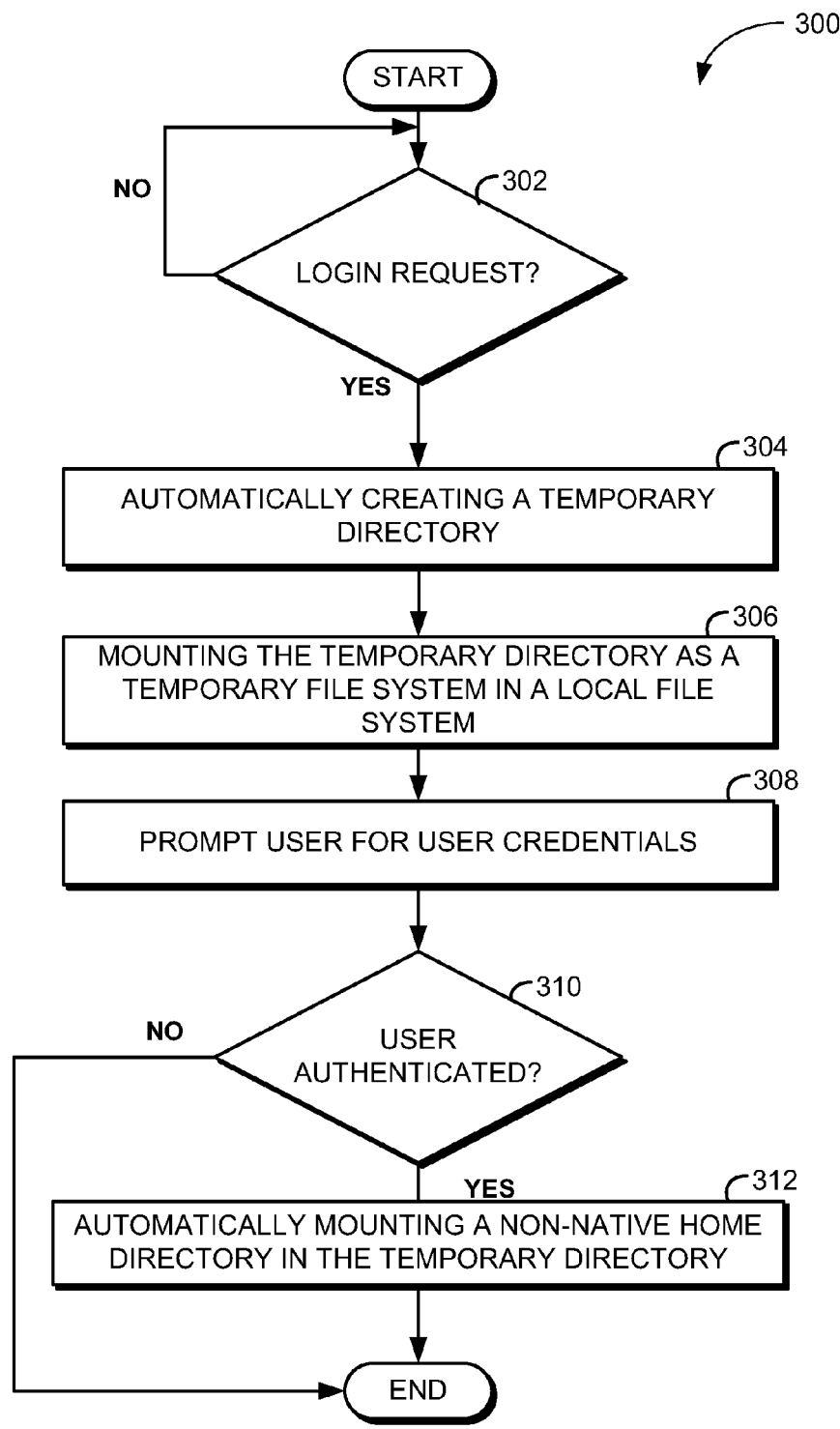
FIG. 3A is a flow diagram of one embodiment of a method of automatically mounting an authenticated non-native directory to a local file system.

FIG. 3A is a flow diagram of one embodiment of a method 300 of automatically mounting an authenticated non-native directory to a local file system. The method 300 is performed by processing logic that may comprise hardware (circuitry, dedicated logic, etc.), software (such as is run on a general purpose computing system or a dedicated machine), firmware (embedded software), or any combination thereof. In one embodiment, the non-native directory manager 124 of FIGS. 1 and 2 perform the method 300. Alternatively, other components of the client computing system 108, host computing system 104, or of both can perform some or all of the operations of method 300.

Referring to FIG. 3A, processing logic begins with determining whether a login request is received (block 302). If not, the processing logic wait until a login request is received. When the login request is received at block 302, the processing logic automatically bind mounts a temporary directory on a local file system, the temporary directory not requiring authentication of the user logging in. In the depicted embodiment, this is done by the processing logic automatically creating a temporary directory (block 304) and mounting the temporary directory as the temporary file system in a local file system (block 306). Next, the processing logic prompts the user for user credentials (block 308). As described herein, in other embodiments, the user credentials can be provided with the login request itself or in other manners without the processing logic requesting the user credentials. At block 310, the processing logic verifies the user credentials to authenticate the user. If at block 310 the user is not authenticated, the method 300 ends. However, if at block 310 the user is authenticated, the processing logic automatically mounts a non-native home directory (or other non-native directory) in the temporary directory (block 312), and the method 300 ends.

In another embodiment of the method, the processing logic copies contents of a configuration skeleton directory to the temporary directory. In another embodiment, the processing logic flags the temporary directory for the automatically mounting the non-native directory. In one embodiment, the processing logic creates a designated file in the temporary directory. In another embodiment, the designated file is copied with the contents of the configuration skeleton directory to the temporary directory. In another embodiment, the processing logic changes ownership of the temporary directory to the specified user. In another embodiment, the ownership of the temporary directory is changed to the specified user and other users, such as root users or other non-root users.

In another embodiment of the method, the processing logic executes the first script to bind mount the temporary directory in the local file system, and executes the second script to mount the non-native directory in the temporary directory in response to successful authentication of the user.

In another embodiment, the processing logic executes the second script to present a user interface to receive user credentials, receive the user credentials via the user interface, and verify the user credentials to authenticate the user. In response to successfully verifying the user credentials, the processing logic mounts the non-native home directory associated with the user in the temporary directory (or other non-native directory).

Figure 3B:
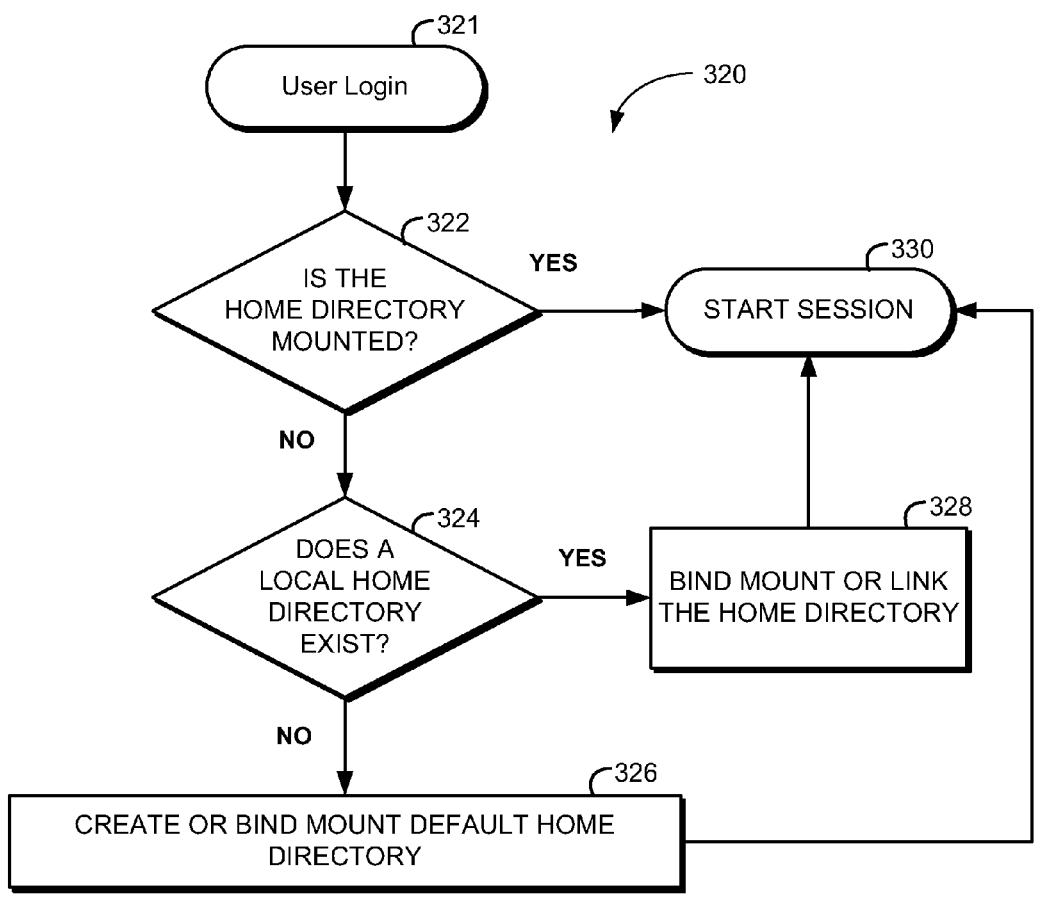
FIG. 3B is a flow diagram of one embodiment of a method of starting a session.

FIG. 3B is a flow diagram of one embodiment of a method 320 of starting a session. The method 320 is performed by processing logic that may comprise hardware (circuitry, dedicated logic, etc.), software (such as is run on a general purpose computing system or a dedicated machine), firmware (embedded software), or any combination thereof. In one embodiment, the non-native directory manager 124 of FIGS. 1 and 2 perform the method 320. Alternatively, other components of the client computing system 108, host computing system 104, or of both can perform some or all of the operations of method 320.

Referring to FIG. 3B, processing logic begins with the user login (block 321). When processing logic receives an indication of a user login, the processing logic determines if the home directory is mounted (block 322). If the home directory is mounted, the processing logic proceeds to block 330 to start the session. If the home directory is not mounted, the processing logic determines if a local home directory exists (block 324). If at block 324 the processing logic determines that the local home directory exists, the processing logic bind mounts or links the home directory (block 328) and proceeds to block 330 to start the session. If at block 324 the processing logic determines that the local home directory does not exist, the processing logic creates or bind mounts a default home directory (block 326), and proceeds to block 330 to start the session. In one embodiment, the default home directory can be marked as being automatically created. This could be something as simple as creating a dummy file with a touch command. Alternatively, the default home directory can be marked in other ways as would be appreciated by one of ordinary skill in the art having the benefit of this disclosure.

Figure 3C:
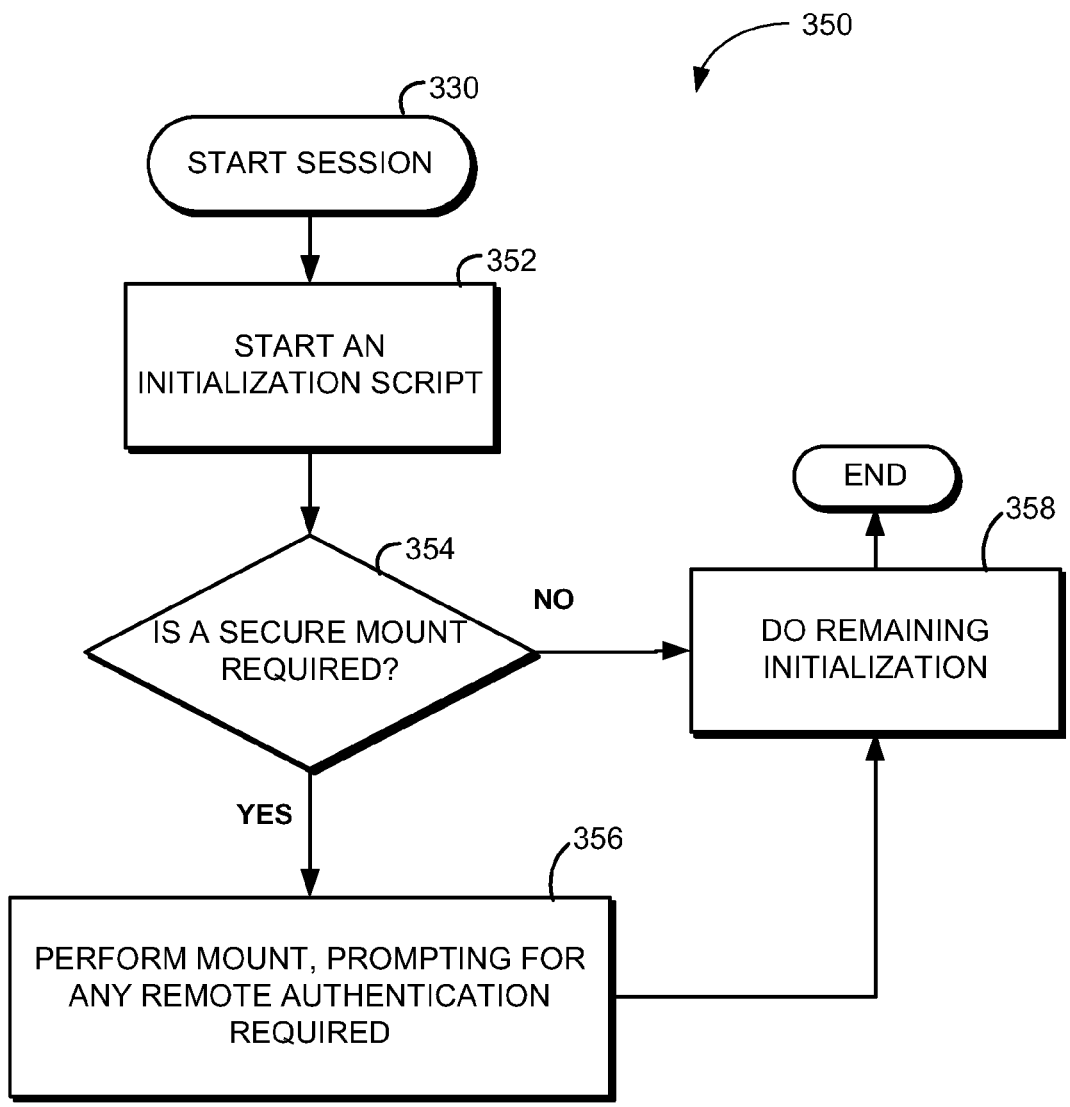
FIG. 3C is a flow diagram of one embodiment of a method of remotely authenticating the user.

FIG. 3C is a flow diagram of one embodiment of a method 350 of remotely authenticating the user. The method 350 is performed by processing logic that may comprise hardware (circuitry, dedicated logic, etc.), software (such as is run on a general purpose computing system or a dedicated machine), firmware (embedded software), or any combination thereof. In one embodiment, the non-native directory manager 124 of FIGS. 1 and 2 perform the method 350. Alternatively, other components of the client computing system 108, host computing system 104, or of both can perform some or all of the operations of method 350.

Referring to FIG. 3C, processing logic begins with the session being started (block 330). Next, the processing logic starts an initialization script (block 352). There are many possible initialization scripts that can contain this logic of method 350. For non-interactive logins, scripts like /etc/profile, /etc/bashrc may be used, for example. For X11 console logins, the logic can be added to the xinitrc shell script. It should be noted that it may be better to put this logic in system initialization scripts than in initialization scripts in the user's home directory. Next, processing logic determines if a secure mount is required (block 354). If a secure mount is not required, the processing logic performs any remaining initialization (block 358), and the method 350 ends. However, if the processing logic determines that a secure mount is required at block 354, the processing logic performs the mount, prompting for any remote authentication required (block 356) and then proceeds to block 358 to perform any remaining initialization.

It should be noted that some embodiments describe performing the mounting and prompting using system initialization scripts. However, in other embodiments, a FUSE module may be used in which the mounting and prompting operations could be integrated into the FUSE program itself, instead of putting the mounting and prompting in the system initialization scripts. The processing logic described herein could be wrapped in a FUSE module so that it can be packaged in a software program. This could be done in several ways, but in one embodiment, the FUSE program could directly access the tty, or open an X11 window to prompt for any necessary authentication information. This may provide some administrative benefits of having the operations in a self-contained application. Of course, the system initialization scripts could still be used.

Figure 4:
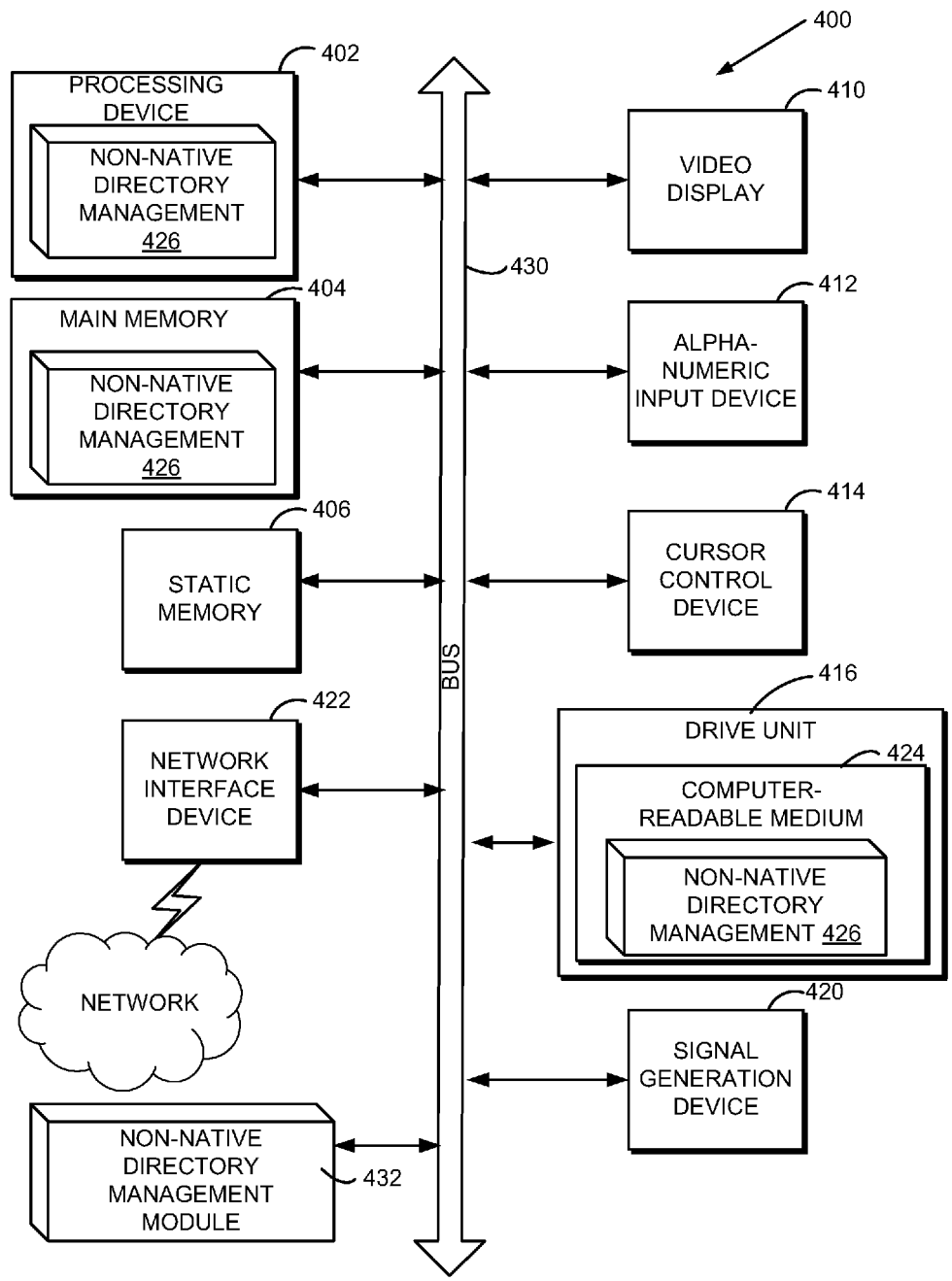
FIG. 4 illustrates a diagrammatic representation of a machine in the exemplary form of a computing system for non-native directory management.

FIG. 4 illustrates a diagrammatic representation of a machine in the exemplary form of a computing system 400 for non-native directory management. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for non-native directory management, such as the methods 300, 320, and 350 described above. In one embodiment, the computing system 400 represents various components that may be implemented in the client computing system 108 as described above. Alternatively, the client computing system 108 may include more or less components as illustrated in the computing system 400. In another embodiment, the computing system 400 represents various components that may be implemented in the host computing system 104.

The exemplary computing system 400 includes a processing device 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., non-native directory management 426) for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., non-native directory management 426) embodying any one or more of the methodologies or functions described herein. The non-native directory management 426 may also reside, completely or at least partially, within the main memory 404 and/or within the processing device 402 during execution thereof by the computing system 400, the main memory 404 and the processing device 402 also constituting computer-readable storage media. The non-native directory management 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The non-native directory management module 432, components, and other features described herein (for example in relation to FIGS. 1-3) can be implemented as discrete hardware components or integrated in the functionality of hardware components such as ASICS, FPGAs, DSPs, or similar devices. The non-native directory management module 432 may implement operations of non-native directory management as described herein with respect to FIGS. 4A and 4B. In addition, the non-native directory management module 432 can be implemented as firmware or functional circuitry within hardware devices. Further, the non-native directory management module 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   receiving, at a computing system, a user login request;
   in response to said receiving the login request, mounting a temporary directory on a local file system of the computing system, wherein the temporary directory does not require authentication;
   determining whether a non-native directory associated with the user is mounted on the computing system, wherein the non-native directory is a non-native home directory associated with the user;
   in response to determining that the non-native directory is not mounted on the computing system, determining whether the non-native directory exists;
   authenticating the user using user credentials; and
   in response to said authenticating the user, and in response to determining that the non-native directory exists, mounting the non-native directory in the temporary directory, wherein the non-native directory is stored at a remote location from the computing system, wherein said mounting the temporary directory comprises executing a first script to mount the temporary directory with specified permissions so the temporary directory does not require authentication by the user.

2. The method of claim 1, wherein the said executing the first script comprises:
   creating the temporary directory;

mounting the temporary directory as a temporary file system in the local file system;
copying contents of a configuration skeleton directory to the temporary directory;
flagging the temporary directory with a designated file for said mounting the non-native home directory; and
changing ownership of the temporary directory to the user.

3. The method of claim 1, wherein said mounting the temporary directory comprises:
creating the temporary directory;
mounting the temporary directory as a temporary file system in the local file system; and
copying contents of a configuration skeleton directory to the temporary directory.

4. The method of claim 1, wherein said mounting the non-native home directory comprises executing a login script to mount the non-native home directory.

5. The method of claim 3, wherein said mounting the temporary directory further comprises flagging the temporary directory with a designated file for said mounting the normative non-native home directory.

6. The method of claim 3, wherein said mounting the temporary directory further comprises changing ownership of the temporary directory.

7. The method of claim 4, wherein said executing the login script comprises:
presenting a user interface to receive user credentials;
receiving the user credentials via the user interface;
verifying the user credentials to authenticate the user; and
upon successful authentication, said mounting the non-native home directory associated with the user in the temporary directory.

8. The method of claim 7, wherein said executing the login script further comprises:
determining if the user has designated privileges to allow said mounting the non-native home directory;
allowing said mounting the non-native home directory when the user has the designated privileges; and
preventing said mounting the non-native home directory when the user does not have the designated privileges.

9. The method of claim 7, wherein said executing the login script further comprises performing a sshfs command to mount the non-native home directory in the temporary directory.

10. A non-transitory computer readable medium including instructions that, when executed by a computing system, cause the computing system to execute operations comprising:
receiving, at a computing system, a user login request;
in response to said receiving the login request, mounting a temporary directory on a local file system of the computing system, wherein the temporary directory does not require authentication;
determining whether a non-native directory associated with the user is mounted on the computing system, wherein the non-native directory is a non-native home directory associated with the user;
in response to determining that the non-native directory is not mounted on the computing system, determining whether the non-native directory exists;
authenticating the user using user credentials; and
in response to said authenticating the user, and in response to determining that the non-native directory exists, mounting the non-native directory in the temporary directory, wherein the non-native directory is stored at a remote location from the computing system, wherein said mounting the temporary directory comprises executing a first script to mount the temporary directory with specified permissions so the temporary directory does not require authentication by the user.

11. The non-transitory computer readable storage medium of claim 10, wherein said mounting the temporary directory comprises:
creating the temporary directory;
mounting the temporary directory as a temporary file system in the local file system; and
copying contents of a configuration skeleton directory to the temporary directory.

12. The non-transitory computer readable storage medium of claim 10, wherein the said executing the first script comprises:
creating the temporary directory;
mounting the temporary directory as a temporary file system in the local file system;
copying contents of a configuration skeleton directory to the temporary directory;
flagging the temporary directory with a designated file for said mounting the non-native home directory; and
changing ownership of the temporary directory.

13. The non-transitory computer readable storage medium of claim 10, wherein said mounting the non-native home directory comprises executing a login script to mount the non-native home directory.

14. The non-transitory computer readable storage medium of claim 11, wherein said mounting the temporary directory further comprises flagging the temporary directory with a designated file for said mounting the non-native home directory.

15. The non-transitory computer readable storage medium of claim 11, wherein said mounting the temporary directory further comprises changing ownership of the temporary directory.

16. The non-transitory computer readable storage medium of claim 13, wherein said executing the login script comprises:
presenting a user interface to receive user credentials;
receiving the user credentials via the user interface;
verifying the user credentials to authenticate the user; and
upon successful authentication, said mounting the non-native home directory associated with the user in the temporary directory.

17. The non-transitory computer readable storage medium of claim 16, wherein said executing the login script further comprises:
determining if the user has designated privileges to allow said mounting the non-native home directory;
allowing said mounting the non-native home directory when the user has the designated privileges; and
preventing said mounting the non-native home directory when the user does not have the designated privileges.

18. The non-transitory computer readable storage medium of claim 16, wherein said executing the login script further comprises performing a sshfs command to mount the non-native home directory in the temporary directory.

19. A computing system comprising:
A data storage device; and
a processing device, coupled to the data storage device, to execute a non-native directory manager, wherein the non-native directory manager receives, at the computing system, a user login request;
in response to said receiving the login request, mount a temporary directory on a local file system of the computing system, wherein the temporary directory does not require authentication;

determining whether a non-native directory associated with the user is mounted on the computing system, wherein the non-native directory is a non-native home directory associated with the user;

in response to determining that the non-native directory is not mounted on the computing system, determining whether the non-native directory exists;

authenticate the user using user credentials; and in response to said authenticate the user, and in response to determine that the non-native directory exists, mount the non-native directory in the temporary directory, wherein the non-native directory is stored at a remote location from the computing system, wherein said mounting the temporary directory comprises executing a first script to mount the temporary directory with specified permissions so the temporary directory does not require authentication by the user.

20. The computing system of claim 19, wherein the non-native directory manager to:

create the temporary directory;

mount the temporary directory as a temporary file system in the local file system; and copy contents of a configuration skeleton directory to the temporary directory.

21. The computing system of claim 19, the non-native directory manager to flag the temporary directory with a designated file for mounting the non-native home directory.

22. The computing system of claim 19, the non-native directory manager to change ownership of the temporary directory.

* * * * *